US012695119B2

(12) United States Patent
Cui et al.

(10) Patent No.: US 12,695,119 B2
(45) Date of Patent: Jul. 28, 2026

(54) ELECTROCHEMICAL DEVICE AND ELECTRONIC DEVICE COMPRISING THE SAME

(71) Applicant: Ningde Amperex Technology Limited, Ningde City (CN)

(72) Inventors: Hui Cui, Ningde City (CN); Wenqiang Li, Ningde City (CN); Yali Xiong, Ningde City (CN); Jianming Zheng, Ningde City (CN)

(73) Assignee: Ningde Amperex Technology Limited, Ningde (CN)

(*) Notice: Subject to any disclaimer, the term of this patent is extended or adjusted under 35 U.S.C. 154(b) by 691 days.

(21) Appl. No.: 17/475,704

(22) Filed: Sep. 15, 2021

(65) Prior Publication Data

US 2022/0006122 A1 Jan. 6, 2022

Related U.S. Application Data

(63) Continuation of application No. PCT/CN2021/081455, filed on Mar. 18, 2021.

(30) Foreign Application Priority Data

Mar. 27, 2020 (CN) ......................... 202010230895.3

(51) Int. Cl.
*H01M 10/0567* (2010.01)
*H01M 4/46* (2006.01)
(Continued)

(52) U.S. Cl.
CPC ....... *H01M 10/0567* (2013.01); *H01M 4/463* (2013.01); *H01M 10/0525* (2013.01); *H01M 10/44* (2013.01)

(58) Field of Classification Search
CPC ............. H01M 10/0567; H01M 4/463; H01M 10/0525; H01M 10/44
(Continued)

(56) References Cited

U.S. PATENT DOCUMENTS 5,658,686 A * 8/1997 Akashi .................... H01M 6/22 252/62.2
2006/0204846 A1 9/2006 Sunagawa et al.
(Continued)

FOREIGN PATENT DOCUMENTS

CN 101069308 A 11/2007
CN 101604769 A 12/2009
(Continued)

OTHER PUBLICATIONS

ISR for International Application PCT/CN2021/081455 mailed May 26, 2021.
(Continued)

*Primary Examiner* — Allison Bourke
*Assistant Examiner* — Robert Gene West
(74) *Attorney, Agent, or Firm* — Maier & Maier, PLLC

(57) ABSTRACT

An electrochemical device includes a positive electrode, a negative electrode, a separator, and an electrolyte, where the electrolyte contains a nitrile compound and transition metal ions, and satisfies 5≤A/B≤30000, where based on a molar mass of the electrolyte, a molar percentage of a cyano group in the electrolyte is A %, and based on a weight of the electrolyte, a weight percentage of the transition metal ions in the electrolyte is B %. The electrochemical device ensures that the cyano group and the transition metal ions in the electrolyte satisfy a specified relationship, to reduce leaching of the transition metal ions from a positive electrode active material and stabilize structural distortion of the positive electrode active material in a charge and discharge
(Continued)

process, thereby improving high-temperature cycle performance and floating charge performance of the electrochemical device.

14 Claims, 1 Drawing Sheet

(51) Int. Cl.
*H01M 10/0525* (2010.01)
*H01M 10/44* (2006.01)

(58) Field of Classification Search
USPC .......................................................... 499/188
See application file for complete search history.

(56) References Cited

U.S. PATENT DOCUMENTS

| | | | | |
|---|---|---|---|---|
| 2010/0099031 | A1* | 4/2010 | Kato | H01M 10/0567 429/345 |
| 2014/0132221 | A1* | 5/2014 | Galloway | H01M 4/134 252/514 |
| 2015/0171472 | A1* | 6/2015 | Kim | H01M 10/0568 429/188 |
| 2015/0221969 | A1* | 8/2015 | Sekine | H01M 8/188 429/105 |
| 2018/0191033 | A1* | 7/2018 | Wessells | H01M 10/056 |
| 2019/0148776 | A1* | 5/2019 | Cho | H01M 10/0567 429/332 |
| 2019/0173124 | A1* | 6/2019 | Zhang | H01M 10/0525 |
| 2020/0099101 | A1* | 3/2020 | Li | H01M 10/0567 |

FOREIGN PATENT DOCUMENTS

| | | | | | |
|---|---|---|---|---|---|
| CN | 102983358 | A | | 3/2013 | |
| CN | 103250296 | A | | 8/2013 | |
| CN | 103443993 | A | | 12/2013 | |
| CN | 103579667 | A | | 2/2014 | |
| CN | 108539269 | A | * | 9/2018 | H01M 10/052 |
| CN | 108987805 | A | * | 12/2018 | H01M 10/0525 |
| CN | 109103489 | A | | 12/2018 | |
| CN | 109301323 | A | | 2/2019 | |
| CN | 109786834 | A | | 5/2019 | |
| CN | 109860703 | A | | 6/2019 | |
| CN | 110380120 | A | | 10/2019 | |
| CN | 110797575 | A | | 2/2020 | |
| CN | 110808413 | A | | 2/2020 | |
| CN | 111416152 | A | | 7/2020 | |
| CN | 110265632 | A | | 9/2020 | |
| CN | 109301323 | B | * | 10/2020 | H01M 10/0525 |
| CN | 110336075 | A | | 1/2022 | |
| JP | 2015146314 | A | | 8/2015 | |
| KR | 100709833 | B1 | | 4/2007 | |
| WO | 2017030416 | A1 | | 2/2017 | |
| WO | 2018024095 | A1 | | 2/2018 | |

OTHER PUBLICATIONS

CN111416152 A dated Jul. 14, 2020 _English Translation.
CN108987805 A dated Dec. 11, 2018 _English Translation.
CN109301323 A dated Feb. 1, 2019 _English Translation.
CN103579667 A dated Feb. 12, 2014 _English Translation.
CN109860703 A dated Feb. 1, 2019 _English Translation.
First Office Action issued on Jan. 6, 2021 regarding the CN counterpart 202010230895.3.
Long Wang, et al.: 1,3,6-Hexanetricarbonitrile as electrolyte additive for enhancing electrochemical performance of high voltage Li-rich layered oxide cathode: Journal of Power Sources 361 (2017) 227-236.
Young-Soo Kim, et al.: Succinonitrile as a Corrosion Inhibitor of Copper Current Collectors for Overdischarge Protection of Lithium Ion Batteries: ACS Applied Materials and Interfaces: 2014, 6, 2039-2043.
Er-bo Shi, et al.: Research Progress of nitrile-based compounds for lithium ions batteries: 2020, vol. 44, No. 2, 281-284.
Fengjuan Tang: Study on the Effect of Trace Water and Metal Ions for Battery Performance in Electrolyte: Lanzhou University of Technology: Jun. 2017.
Shinichi Komaba, et al.: Influence of manganese(II), cobalt(II), and nickel(II) additives in electrolyte on performance of graphite anode for lithium-ion batteries: Electrochimica Acta 47 (2002) 1229-1239.
Haisheng Song: Capacity fading of LifePO4/graphite batteries cycled at elevated temperature: Database of Chinese Ph.D. degree thesis: vol. 2 in Engineering Technologies: 2015: No. 1: C042-33: Jun. 2013.
Second Office Action issued on Apr. 23, 2021 regarding the CN counterpart 202010230895.3.
CN101069308 A dated Nov. 7, 2007 _English Translation.
Office Action for China 202010230895.3, dated Jan. 11, 2022, 4 pages.
Office Action for China Application No. 202210265432.X, dated Jan. 6, 2024, 7 pages.
Office Action for China Application No. 202210267262.9, dated Nov. 22, 2023, 5 pages.
Extended European Search Report for Application No. PCT/CN2021/081455, dated Oct. 5, 2023, 13 pages.

* cited by examiner

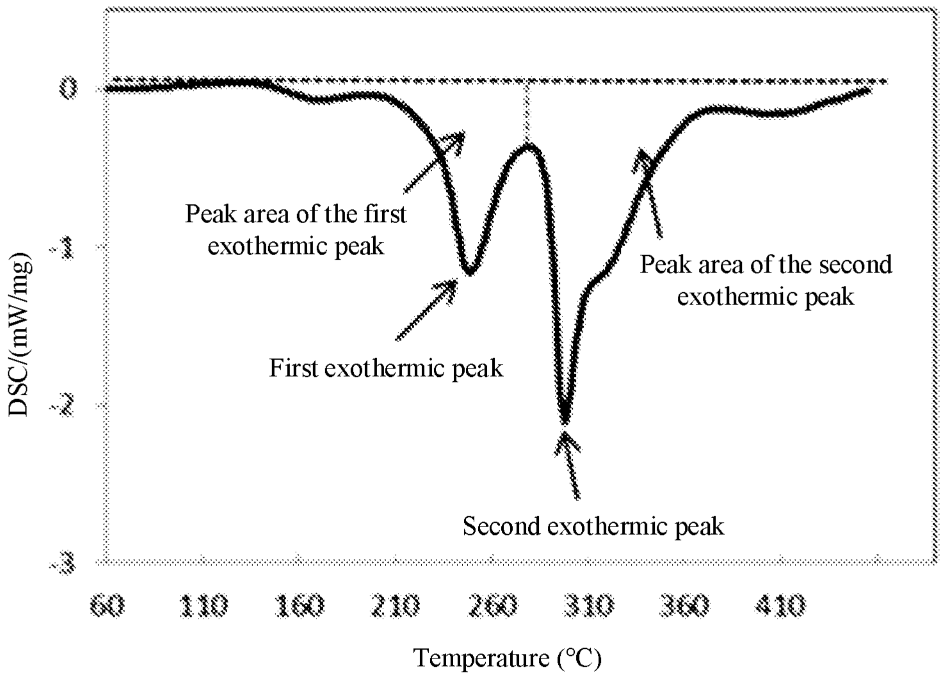
0
-1
-2
-3
DSC/(mW/mg)
Peak area of the first exothermic peak
First exothermic peak
Second exothermic peak
Peak area of the second exothermic peak
60
110
160
210
260
310
360
410
Temperature (°C)

ELECTROCHEMICAL DEVICE AND ELECTRONIC DEVICE COMPRISING THE SAME

This application is a continuation of PCT International Application PCT/CN2021/081455, filed on 18 Mar. 2021, which claims the benefit of priority from the China Patent Application No. 202010230895.3, filed on 27 Mar. 2020, the disclosure of which is hereby incorporated by reference in its entirety.

BACKGROUND

1. Technical Field

This application relates to the field of energy storage technologies, and in particular, to an electrochemical device and an electronic device comprising the same.

2. Description of the Prior Art

Electrochemical device (for example, lithium-ion batteries) are widely used in wearable devices, smart phones, drones, notebook computers, and other fields because of their merits such as high working voltages, high energy density, environmental friendliness, stable cycling, and safety. With development of modern information technologies and expanded application of the lithium-ion batteries, higher requirements, namely, high energy density, long cycle life, and excellent storage properties, are put forward for the lithium-ion batteries. Interaction between an electrolyte and positive and negative electrodes affects these properties, especially when a working voltage is increased to 4.4 V to improve energy density of a lithium-ion battery, instability of an interface between the electrolyte and a positive electrode active material is increased, and the lithium-ion battery swells severely at a high temperature, and cycle performance and charge-discharge performance are reduced, severely limiting performance of the lithium-ion battery. To improve the properties of the lithium-ion batteries, existing lithium-ion battery technologies usually optimize only an electrolyte or improve only a positive electrode active material, instead of conducting in-depth exploration of an entire lithium-ion battery system, and therefore overall performance of the lithium-ion batteries cannot be improved.

SUMMARY

This application provides an electrochemical device in an attempt to resolve at least one problem in the related field to at least some extent.

This application optimizes an entire electrochemical device system by adding a nitrile compound in an electrolyte and adjusting a relationship between a cyano group content and a transition metal ion content in the electrolyte, so as to improve high-temperature cycle performance and floating charge performance of an electrochemical device. In addition, this application also studies impact of a relationship between a doping element content in a positive electrode active material and the cyano group content in the electrolyte on the high-temperature cycle performance and the floating charge performance of the electrochemical device.

According to an embodiment of this application, this application provides an electrochemical device, including a positive electrode, a negative electrode, a separator, and an electrolyte, where the electrolyte contains a nitrile compound and transition metal ions, and satisfies $5 \le A/B \le 30000$, where based on a total molar mass of the electrolyte, a molar percentage of a cyano group in the electrolyte is A %, and based on a total weight of the electrolyte, a total weight percentage of the transition metal ions in the electrolyte is B %.

According to an embodiment of this application, in the electrochemical device according to this application, the transition metal ions comprises at least one of iron ions, cobalt ions, nickel ions, manganese ions, or copper ions.

According to an embodiment of this application, in the electrochemical device according to this application, the transition metal ions comprises at least one of cobalt ions or copper ions.

According to an embodiment of this application, in the electrochemical device according to this application, the nitrile compound comprises at least one of a compound of formula I, a compound of formula II, or a compound of formula III:

formula I

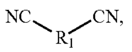

formula II

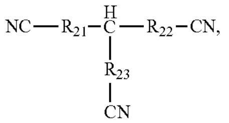

or formula III

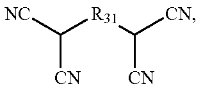

where $R_1$ is selected from substituted or unsubstituted $C_1$ to $C_{10}$ alkylidene groups, substituted or unsubstituted $C_1$ to $C_{10}$ alkyleneoxy groups, substituted or unsubstituted $C_2$ to $C_{10}$ alkenylene groups, substituted or unsubstituted $C_6$ to $C_{12}$ arylene groups, and substituted or unsubstituted $C_6$ to $C_{10}$ cycloalkylidene groups, where when substitution is performed, a substituent group is selected from at least one of halogen, a cyano group, or a carboxyl group; $R_{21}$, $R_{22}$, and $R_{23}$ are each independently selected from a single bond, substituted or unsubstituted $C_1$ to $C_5$ alkylidene groups, and substituted or unsubstituted $C_1$ to $C_{10}$ alkyleneoxy groups, where when substitution is performed, a substituent group is selected from at least one of halogen, a cyano group, or a carboxyl group; and $R_{31}$ is selected from substituted or unsubstituted $C_1$ to $C_5$ alkylidene groups, substituted or unsubstituted $C_1$ to $C_5$ alkyleneoxy groups, substituted or unsubstituted $C_2$ to $C_{10}$ alkenylene groups, substituted or unsubstituted $C_3$ to $C_6$ cycloalkylidene groups, substituted or unsubstituted $C_6$ to $C_{10}$ arylene groups, and substituted or unsubstituted $C_1$ to $C_6$ heterocyclylene groups, where when substitution is performed, a substituent group is selected from at least one of halogen, a cyano group, or a carboxyl group, and a heteroatom of the heterocyclylene group is selected from at least one of O, N, P, or S.

According to an embodiment of this application, based on the total weight of the electrolyte, a weight percentage of the cobalt ions in the electrolyte is less than or equal to 0.1%, and a weight percentage of the copper ions in the electrolyte is less than or equal to 0.1%.

According to an embodiment of this application, the positive electrode contains a positive electrode active material, and the positive electrode active material contains the aluminum element, where based on a total weight of the positive electrode active material, a weight percentage of the aluminum element is C %, and a numerical range of C is $0.001<C<1$.

According to an embodiment of this application, A and C satisfy the following relationship: $0.01\leq A/C\leq 170$.

According to an embodiment of this application, a curve of the positive electrode active material obtained through a differential scanning calorimetry test comprises a first exothermic peak and a second exothermic peak, where a temperature corresponding to the first exothermic peak is X, 240° C.≤X≤280° C., a temperature corresponding to the second exothermic peak is Y, and 280° C.<Y≤340° C.

According to an embodiment of this application, a peak area of the first exothermic peak is ≤50 J/g, and a peak area of the second exothermic peak is ≤800 J/g.

According to an embodiment of this application, the electrolyte further comprises a compound of formula IV:

formula IV

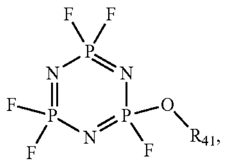

where $R_{41}$ is selected from substituted or unsubstituted $C_1$ to $C_{12}$ alkyl groups, substituted or unsubstituted $C_3$ to $C_{12}$ cycloalkyl groups, substituted or unsubstituted $C_2$ to $C_{12}$ alkenyl groups, substituted or unsubstituted $C_2$ to $C_{12}$ alkynyl groups, substituted or unsubstituted $C_6$ to $C_{22}$ aryl groups, and substituted or unsubstituted $C_5$ to $C_{22}$ heteroaryl groups, where when substitution is performed, a substituent group is selected from at least one of halogen, a cyano group, or a carboxyl group; and based on the weight of the electrolyte solution, a weight percentage of the compound of formula IV is 0.001% to 5%.

According to an embodiment of this application, the electrolyte further comprises a first additive, the first additive comprises at least one of vinyl ethylene carbonate, fluorobenzene, lithium difluorophosphate, lithium tetrafluoroborate, 1,3,2-dioxathiolane,2,2-dioxide, fluoroethylene carbonate, vinylene carbonate, or 1,3-propane sultone, and based on the total weight of the electrolyte, a weight percentage of the first additive is 0.001% to 13%.

The electrochemical device according to this application ensures that the cyano group and the transition metal ions in the electrolyte satisfy a specified relationship, to reduce leaching of the transition metal ions from a positive electrode active material and stabilize structural distortion of the positive electrode active material in a charge and discharge process, thereby improving high-temperature cycle performance and floating charge performance of the electrochemical device.

According to an embodiment of this application, this application further provides an electronic device, where the electronic device comprises any one of the foregoing electrochemical device.

Additional aspects and advantages of the embodiments of this application are partially described and presented in subsequent descriptions, or explained by implementation of the embodiments of this application.

BRIEF DESCRIPTION OF DRAWINGS

To describe embodiments of this application, the following briefly describes the accompanying drawings required for describing the embodiments of this application or the prior art. Apparently, the accompanying drawings described below are merely some embodiments of this application. A person skilled in the art may still derive drawings for other embodiments from structures shown in these accompanying drawings without creative efforts.

FIG. 1 is a curve graph of a positive electrode active material obtained through a differential scanning calorimetry (DSC) test in Embodiment 30 of this application.

DETAILED DESCRIPTION

Embodiments of this application are described in detail below. In the full text of the specification of this application, the same or similar components and components with the same or similar functions are indicated by similar reference signs. The embodiments in related accompanying drawings described herein are descriptive and illustrative, and are used to provide a basic understanding of this application. The embodiments of this application shall not be construed as a limitation on this application.

The terms "about", "roughly", "substantially", and "about" used herein are intended to describe and represent small variations. When used in combination with an event or a circumstance, the term may refer to an Embodiment in which the exact event or circumstance occurs or an Embodiment in which an extremely similar event or circumstance occurs. For example, when used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if a difference between two values is less than or equal to ±10% of an average value of the values (for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), the two values may be considered "roughly" the same.

In addition, quantities, ratios, and other values are sometimes presented in the format of ranges in this specification. It should be understood that such range formats are used for convenience and simplicity and should be flexibly understood as including not only values clearly designated as falling within the range but also all individual values or sub-ranges covered by the range as if each value and sub-range are clearly designated.

In the specific embodiments and claims, an item list connected by the terms "at least one of", "at least one piece of", "at least one kind of" or other similar terms may mean any combination of the listed items. For example, if items A and B are listed, the phrase "at least one of A or B" means only A; only B; or A and B. In another Embodiment, if items A, B, and C are listed, the phrase "at least one of A, B, or C" means only A; only B; only C; A and B (exclusive of C); A and C (exclusive of B); B and C (exclusive of A); or all of A, B, and C. The item A may contain one constituent or a plurality of constituents. The item B may contain one constituent or a plurality of constituents. The item C may contain one constituent or a plurality of constituents.

The term "alkyl group" is intended to be a straight-chain saturated hydrocarbon structure having 1 to 20 carbon atoms. The term "alkyl group" is also intended to be a branched or cyclic hydrocarbon structure having 3 to 20 carbon atoms. For example, the alkyl group may be an alkyl group having 1 to 20 carbon atoms, an alkyl group having 1 to 10 carbon atoms, an alkyl group having 1 to 5 carbon atoms, an alkyl group having 5 to 20 carbon atoms, an alkyl group having 5 to 15 carbon atoms, or an alkyl group having 5 to 10 carbon atoms. References to an alkyl group with a specific carbon number are intended to cover all geometric isomers with the specific carbon number. Therefore, for example, "butyl" is meant to comprises n-butyl, sec-butyl, isobutyl, tert-butyl, and cyclobutyl; and "propyl" comprises n-propyl, isopropyl, and cyclopropyl. Embodiments of the alkyl group comprises, but are not limited to, a methyl group, an ethyl group, an n-propyl group, an isopropyl group, an cyclopropyl group, an n-butyl group, an isobutyl group, a sec-butyl group, a tert-butyl group, a cyclobutyl group, an n-pentyl group, an isopentyl group, a neopentyl group, a cyclopentyl group, a methylcyclopentyl group, an ethylcyclopentyl group, an n-hexyl group, an isohexyl group, a cyclohexyl group, an n-heptyl group, an octyl group, a cyclopropyl group, a cyclobutyl group, a norbornyl group, and the like. In addition, the alkyl group may be arbitrarily substituted.

As used herein, the term "alkylidene group" means a straight-chain or branched divalent saturated hydrocarbon group. For example, the alkylidene group may be an alkylidene group having 1 to 20 carbon atoms, an alkylidene group having 1 to 15 carbon atoms, an alkylidene group having 1 to 10 carbon atoms, an alkylidene group having 1 to 5 carbon atoms, an alkylidene group having 5 to 20 carbon atoms, an alkylidene group having 5 to 15 carbon atoms, or an alkylidene group having 5 to 10 carbon atoms. Representative alkylidene groups comprises, for example, methylene, ethane-1,2-diyl ("ethylene"), propane-1,2-diyl, propane-1,3-diyl, butane-1,4-diyl, and pentane-1,5-diyl. In addition, the alkylidene group may be arbitrarily substituted.

The term "cycloalkyl group" covers cyclic alkyl groups. The cycloalkyl group may be a cycloalkyl group having 3 to 20 carbon atoms, a cycloalkyl group having 6 to 20 carbon atoms, a cycloalkyl group having 3 to 10 carbon atoms, or a cycloalkyl group having 3 to 6 carbon atoms. For example, the cycloalkyl group may be cyclopropyl, cyclobutyl, cyclopentyl, cyclohexyl, or the like. In addition, the cycloalkyl group may be arbitrarily substituted.

The term "cycloalkylidene group" alone or as a part of another substituent group means a divalent free radical derived from a cycloalkyl group.

The term "alkenyl group" is a straight-chain or branched monovalent unsaturated hydrocarbon group having at least one and usually 1, 2, or 3 carbon-carbon double bonds. Unless otherwise defined, the alkenyl group generally contains 2 to 20 carbon atoms. For example, the alkenyl group may be an alkenyl group having 2 to 20 carbon atoms, an alkenyl group having 6 to 20 carbon atoms, an alkenyl group having 2 to 10 carbon atoms, or an alkenyl group having 2 to 6 carbon atoms. Representative alkenyl groups comprises, for example, vinyl, n-propenyl, isopropenyl, n-but-2-enyl, but-3-enyl, and n-hex-3-enyl. In addition, the alkenyl group may be arbitrarily substituted.

The term "alkenylene group" covers straight-chain and branched chain alkenylene groups. References to an alkenylene group with a specific carbon number are intended to cover all geometric isomers with the specific carbon number. For example, the alkenylene group may be an alkenylene group having 2 to 20 carbon atoms, an alkenylene group having 2 to 15 carbon atoms, an alkenylene group having 2 to 10 carbon atoms, an alkenylene group having 2 to 5 carbon atoms, an alkenylene group having 5 to 20 carbon atoms, an alkenylene group having 5 to 15 carbon atoms, or an alkenylene group having 5 to 10 carbon atoms. Representative alkylidene groups comprises, for example, vinylene, propenylene, and butenylene. In addition, the alkenylene group may be arbitrarily substituted.

The term "alkynyl group" refers to a straight-chain or branched monovalent unsaturated hydrocarbon group having at least one and usually 1, 2, or 3 carbon-carbon triple bonds. Unless otherwise defined, the alkynyl group generally contains 2 to 20 carbon atoms. For example, the alkynyl group may be an alkynyl group having 2 to 20 carbon atoms, an alkynyl group having 6 to 20 carbon atoms, an alkynyl group having 2 to 10 carbon atoms, or an alkynyl group having 2 to 6 carbon atoms. Representative alkynyl groups comprises, for example, ethynyl, prop-2-ynyl(n-propynyl), n-but-2-ynyl, and n-hex-3-ynyl. In addition, the alkynyl group may be arbitrarily substituted.

The term "alkoxy group" is an L-O-group, where L is an alkyl group. The alkoxy group herein may be an alkoxy group having 1 to 12 carbon atoms, an alkoxy group having 1 to 10 carbon atoms, an alkoxy group having 1 to 5 carbon atoms, an alkoxy group having 5 to 12 carbon atoms, or an alkoxy group having 5 to 10 carbon atoms.

The term "alkyleneoxy group" alone or as a part of another substituent group means a divalent free radical derived from an alkoxy group.

The term "aryl group" covers both monocyclic and polycyclic systems. A polycyclic ring may have two or more rings in which two carbons are shared by two adjacent rings (the rings are "fused"), where at least one of the rings is aromatic, and other rings, for example, may be a cycloalkyl group, a cycloalkenyl group, an aryl group, a heterocyclic and/or heteroaryl group. For example, the aryl group may be $C_6$ to $C_{50}$ aryl groups, $C_6$ to $C_{40}$ aryl groups, $C_6$ to $C_{30}$ aryl groups, $C_6$ to $C_{20}$ aryl groups, or $C_6$ to $C_{10}$ aryl groups. Representative aryl groups comprises, for example, phenyl, methylphenyl, propylphenyl, isopropylphenyl, benzyl, naphth-1-yl, and naphth-2-yl. In addition, the aryl group may be arbitrarily substituted.

The term "arylene group" alone or as a part of another substituent group means a divalent free radical derived from an aryl group.

The term "heteroaryl group" covers monocyclic heteromatic groups, each of which may contain one to three hetero atoms, for example, pyrrole, furan, thiophene, imidazole, oxazole, thiazole, triazole, pyrazole, pyridine, pyrazine, and pyrimidine. The term "heteroaryl group" further comprises a polycyclic aromatic system having two or more cycles with two of atoms shared by two adjacent cycles (which are "condensed"), where at least one of the cycles is a heteroaryl group, and other cycles may be a cycloalkyl group, a cycloalkenyl group, an aryl group, a heterocycle group, and/or a heteroaryl group. For example, the heteroaryl group may be $C_6$ to $C_{50}$ heteroaryl groups, $C_6$ to $C_{40}$ heteroaryl groups, $C_6$ to $C_{30}$ heteroaryl groups, $C_6$ to $C_{20}$ heteroaryl groups, or $C_6$ to $C_{10}$ heteroaryl groups. In addition, the heteroaryl group may be arbitrarily substituted.

The term "heterocyclic group" covers aromatic and non-aromatic cyclic groups. A heteroaromatic cyclic group also means a heteroaryl group. In some embodiments, the heteroaromatic cyclic group and the hetero-non-aromatic cyclic group are $C_1$ to $C_{50}$ heterocyclic groups, $C_1$ to $C_{40}$ heterocyclic groups, $C_1$ to $C_{30}$ heterocyclic groups, $C_1$ to $C_{20}$ heterocyclic groups, $C_1$ to $C_{10}$ heterocyclic groups, and $C_1$ to $C_6$ heterocyclic groups that each comprises at least one heteroatom. For example, they are a morpholinyl group, a piperidinyl group, a pyrrolidinyl group, and the like, and cyclic ether such as tetrahydrofuran and tetrahydropyran. In addition, the heterocyclic group may be arbitrarily substituted.

The term "heterocyclylene group" alone or as a part of another substituent group means a divalent free radical derived from a heterocyclic group.

As used herein, the term "hetero atom" covers 0, S, P, N, B, or isosteres thereof.

As used herein, the term "halogen" may be F, Cl, Br, or I.

I. Electrochemical Device

This application provides an electrochemical device. The electrochemical device comprises a positive electrode, a negative electrode, a separator, and an electrolyte, where the electrolyte of the electrochemical device contains a nitrile compound and transition metal ions, and satisfies $5 \leq A/B \leq 30000$, where based on a total molar mass of the electrolyte, a molar percentage of a cyano group in the electrolyte is A %, and based on a total weight of the electrolyte, a total weight percentage of the transition metal ions in the electrolyte is B %.

In some embodiments, the transition metal ions comprises at least one of iron ions, cobalt ions, nickel ions, manganese ions, or copper ions.

In some embodiments, the transition metal ions comprises at least one of cobalt ions or copper ions.

In some embodiments, the nitrile compound comprises at least one of a compound of formula I, a compound of formula II, or a compound of formula III:

formula I

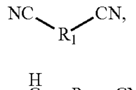

formula II

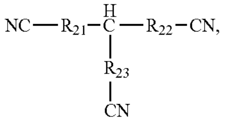

or formula III

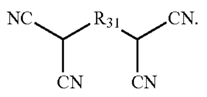

In formula I, $R_1$ is selected from substituted or unsubstituted $C_1$ to $C_{10}$ alkylidene groups, substituted or unsubstituted $C_1$ to $C_{10}$ alkyleneoxy groups, substituted or unsubstituted $C_2$ to $C_{10}$ alkenylene groups, substituted or unsubstituted $C_6$ to $C_{12}$ arylene groups, and substituted or unsubstituted $C_6$ to $C_{10}$ cycloalkylidene groups, where when substitution is performed, a substituent group is selected from at least one of halogen, a cyano group, or a carboxyl group.

In formula II, $R_{21}$, $R_{22}$, and $R_{23}$ are each independently selected from a single bond, substituted or unsubstituted $C_1$ to $C_5$ alkylidene groups, and substituted or unsubstituted $C_1$ to $C_{10}$ alkyleneoxy groups, where when substitution is performed, a substituent group is selected from at least one of halogen, a cyano group, or a carboxyl group.

In formula III, $R_{31}$ is selected from substituted or unsubstituted $C_1$ to $C_5$ alkylidene groups, substituted or unsubstituted $C_1$ to $C_5$ alkyleneoxy groups, substituted or unsubstituted $C_2$ to $C_{10}$ alkenylene groups, substituted or unsubstituted $C_3$ to $C_6$ cycloalkylidene groups, substituted or unsubstituted $C_6$ to $C_{10}$ arylene groups, and substituted or unsubstituted $C_1$ to $C_6$ heterocyclylene groups, where when substitution is performed, a substituent group is selected from at least one of halogen, a cyano group, or a carboxyl group, and a heteroatom of the heterocyclylene group is selected from at least one of O, N, P, or S.

In some embodiments, the nitrile compound of the structural formula I may comprises, but is not limited to, at least one of malononitrile, succinonitrile, glutaronitrile, adiponitrile, heptanedinitrile, octanedinitrile, azelanitrile, sebaconitrile, 2-methyl-malononitrile, ethylmalononitrile, isopropylmalononitrile, tert-butylmalononitrile, 2-methylsuccinonitrile, 2,2-dimethylsuccinonitrile, 2,3-dimethylsuccinonitrile, 2,3,3-trimethyl succinonitrile, 2,2,3,3-tetramethyl succinonitrile, 2,3-diethyl-2,3-dimethyl succinonitrile, 2,2-diethyl-3,3-dimethyl succinonitrile, dicyclohexyl-1,1-dicarbonitrile, dicyclohexyl-2,2-dicarbonitrile, dicyclohexyl-3,3-dicarbonitrile, 2,5-di methyl-2,5-hexane dicarbonitrile, 2,3-diisobutyl-2,3-dimethylsuccinonitrile, 2,2-diisobutyl-3,3-dimethylsuccinonitrile, 2-methyl glutaronitrile, 2,3-dimethyl glutaronitrile, 2,4-dimethyl glutaronitrile, 2,2,3,3-tetramethyl glutaronitrile, 2,2,4,4-tetramethyl glutaronitrile, 2,2,3,4-tetramethyl glutaronitrile, 2,3,3,4-tetramethyl glutaronitrile, malonitrile, fumaronitrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, and 1,4-dicyanobenzene.

In some embodiments, the nitrile compound of formula II may comprises at least one of formula II-1

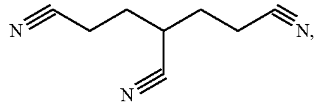

formula II-2

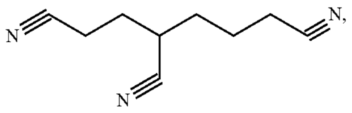

or formula II-3

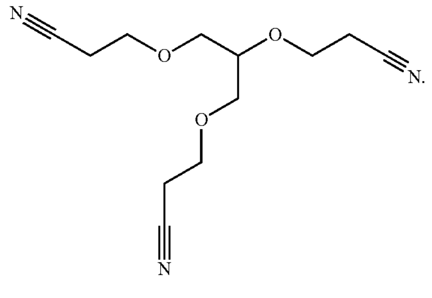

In some embodiments, the nitrile compound of formula III may comprises at least one of formula III-1

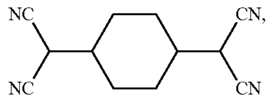

formula III-2

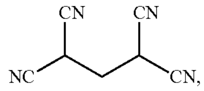

formula III-3

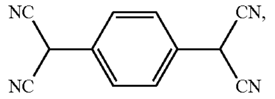

formula III-4

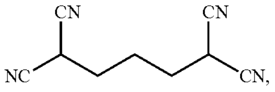

formula III-5

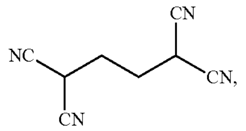

formula III-6

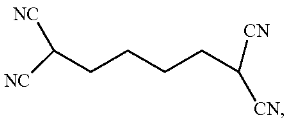

formula III-7

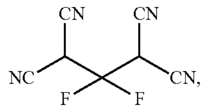

formula III-8

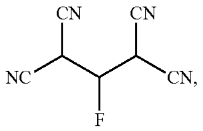

or formula III-9

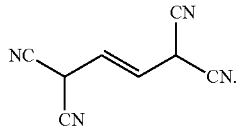

In some embodiments, the transition metal ions comprises at least one of cobalt (Co) ions or copper (Cu) ions, where based on the weight of the electrolyte, a weight percentage of the cobalt ions is less than or equal to about 0.1%, and a weight percentage of the copper ions is less than or equal to about 0.1%. In some embodiments, based on the weight of the electrolyte, the weight percentage of the cobalt ions is less than or equal to about 0.08%, less than or equal to about 0.05%, less than or equal to about 0.03%, less than or equal to about 0.02%, or less than or equal to about 0.001%. In some embodiments, based on the weight of the electrolyte, the weight percentage of the copper ions is less than or equal to about 0.08%, less than or equal to about 0.05%, less than or equal to about 0.03%, less than or equal to about 0.02%, or less than or equal to about 0.001%.

When the weight percentage of the cobalt ions in the electrolyte is less than or equal to 0.1%, the electrochemical device can maintain relatively good cycle performance and floating charge performance. When the weight percentage of the cobalt ions in the electrolyte exceeds 0.1%, a structure of a positive electrode active material is destroyed, resulting in that the transition metal ions in the positive electrode active material is leached, and then deposited on the negative electrode through the electrolyte and catalyzes decomposition of a negative electrode protective film, deteriorating performance of the electrochemical device.

In the electrochemical device, a negative electrode current collector is copper foil. The copper foil is not covered and protected before chemical conversion, and is prone to corrosion by the electrolyte because it is exposed to the electrolyte. The copper foil is oxidized to form copper ions and then dissolve in the electrolyte. In chemical conversion and charge processes, the copper ions are reduced to copper and deposited on the negative electrode, catalyzing decomposition of a solid electrolyte interface (SEI) film of the negative electrode and deteriorating the performance of the electrochemical device. When the weight percentage of the copper ions is less than or equal to 0.1%, there is no significant difference in impact on the performance of the electrochemical device. When the weight percentage of the copper ions exceeds 0.1%, the electrochemical performance of the electrochemical device is deteriorated.

When an upper limit charging voltage of an electrochemical device is increased to 4.4 V, an amount of leached transition metal cobalt ions increases, structural stability of a positive electrode active material becomes worse, and cycle performance and floating charge performance of the electrochemical device become worse. However, the electrochemical device according to this application can still maintain good high-temperature cycle performance and floating charge performance when the upper limit charging voltage is increased to 4.4 V. The nitrile compound in this application can effectively separate an easily oxidizable component in the electrolyte from the positive electrode active material, thereby stabilizing the structure of the positive electrode active material, reducing leaching of the transition metal ions from the positive electrode active material, and improving the high-temperature cycle performance and the floating charge performance of the electrochemical device.

In addition, the nitrile compound can form a stable polymer at the negative electrode (for example, a surface of the exposed copper foil), thereby protecting the negative electrode interface, alleviating corrosion of the copper foil, and then improving the high-temperature storage performance and the floating charge performance. The molar percentage A % of the cyano group in the electrolyte and the total weight percentage B % of the first metal ions in the electrolyte satisfy the following proportional relationship: $5 \leq A/B \leq 30000$. When A/B is in this range, the electrochemical device has good high-temperature cycle performance and floating charge performance.

In some embodiments, to further improve the performance of the electrochemical device, the electrolyte may further comprises a compound of formula IV:

formula IV

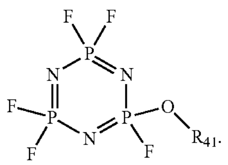

In formula IV, $R_{41}$ is selected from substituted or unsubstituted $C_1$ to $C_{12}$ alkyl groups, substituted or unsubstituted $C_3$ to $C_{12}$ cycloalkyl groups, substituted or unsubstituted $C_2$ to $C_{12}$ alkenyl groups, substituted or unsubstituted $C_2$ to $C_{12}$ alkynyl groups, substituted or unsubstituted $C_6$ to $C_{22}$ aryl groups, and substituted or unsubstituted $C_5$ to $C_{22}$ heteroaryl groups, where when substitution is performed, a substituent group is selected from at least one of halogen, a cyano group, or a carboxyl group; and based on the total weight of the electrolyte solution, a percentage of the compound of formula IV is 0.001% to 5%.

In some embodiments, the compound of formula IV comprises:

at least one of formula IV-1

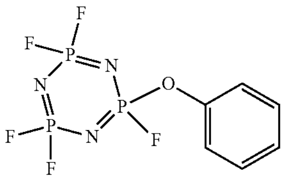, formula IV-2

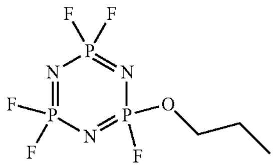, formula IV-3

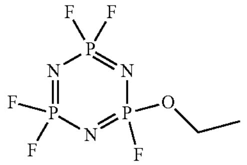, formula IV-4

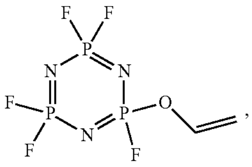, or formula IV-5

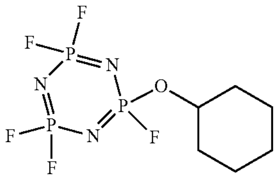.

In some embodiments, the electrolyte further comprises a first additive, the first additive comprises at least one of vinyl ethylene carbonate (VEC), fluorobenzene, lithium difluorophosphate ($LiPO_2F_2$), lithium tetrafluoroborate, 1,3,2-dioxathiolane,2,2-dioxide (DTD), fluoroethylene carbonate (FEC), vinylene carbonate (VC), or 1,3-propane sultone (PS). In some embodiments, based on the weight of the electrolyte, a weight percentage of the first additive is about 0.01% to about 13%. In some embodiments, based on the total weight of the electrolyte, a weight percentage of the first additive is about 0.01%, about 0.05%, about 0.1%, about 0.5%, about 1%, about 2%, about 3%, about 5%, about 8%, about 10%, about 11%, about 12%, or the like.

In some embodiments, based on the total weight of the electrolyte, a weight percentage of the lithium difluorophosphate is less than 1%. In some embodiments, based on the total weight of the electrolyte, a weight percentage of the lithium difluorophosphate is less than 0.5%.

In some embodiments, the positive electrode of the electrochemical device contains a positive electrode active material, and the positive electrode active material contains the aluminum element, where based on a weight of the positive electrode active material, a weight percentage of the aluminum element is 0.001% to 1%. In some embodiments, based on a weight of the positive electrode active material, a weight percentage of the aluminum element is about 0.005%, about 0.01%, about 0.05%, about 0.08%, about 0.1%, about 0.5%, about 0.8%, 0.001% to 0.05%, 0.001% to 0.1%, 0.001% to 0.5%, 0.01% to 0.05%, 0.01% to 0.1%, 0.01% to 0.5%, 0.001% to 0.05%, or the like. In some embodiments, the positive electrode active material comprises lithium cobaltate doped with the aluminum element.

After the positive electrode active material is doped with the aluminum element, the internal structure can be stabilized, thereby improving the electrochemical performance. When the weight percentage of the aluminum element is less than 0.001%, an improvement effect of the positive electrode active material is not obvious. When the weight percentage of the aluminum element is greater than 1%, a discharge capacity of the positive electrode active material is deteriorated due to the excessively high doping amount, which is not conducive to the cycle performance and the floating charge performance of electrochemical device.

In some embodiments, the molar percentage A % of the cyano group in the electrolyte and a weight percentage C % of aluminum ions in the electrolyte satisfy: $0.01 \leq A/C \leq 170$, so as to effectively improve the cycle performance and the floating charge performance of the electrochemical device. When A/C is less than 0.01, the effect of stabilizing the structure of the positive electrode active material and increasing corrosion resistance of the copper foil is not obvious, and therefore the cycle performance and the floating charge performance cannot be significantly improved. When A/C is greater than 170, the discharge capacity of the positive electrode active material is too low and polarization of the electrochemical device is too large, and therefore the cycle performance and the floating charge performance cannot be improved.

In some embodiments, the positive electrode active material may be selected from lithium cobalt oxide, lithium nickel cobalt manganate, lithium nickel cobalt aluminate, or any combinations thereof. In some embodiments, to further improve the performance of the electrochemical device, a curve of the positive electrode active material obtained through a differential scanning calorimetry test comprises a first exothermic peak and a second exothermic peak, where a temperature corresponding to the first exothermic peak is X, 240° C.≤X≤280° C., a temperature corresponding to the second exothermic peak is Y, and 280° C.<Y≤340° C. In some embodiments, a peak area of the first exothermic peak is ≤50 J/g, and a peak area of the second exothermic peak is ≤800 J/g. When the foregoing conditions are met, the positive electrode active material has more excellent thermal stability, so that the cycle performance and the floating charge performance of the electrochemical device can be improved. In Embodiments of this application, positive electrode active materials in Embodiments subjected to the DSC test are all fully discharged (in a delithiated state) positive electrode active materials. FIG. 1 shows a curve of a positive electrode active material obtained through a DSC test in Embodiment 30. In some embodiments, the electrolyte further comprises a second additive. The second additive comprises a phosphorus-containing compound. The phosphorus-containing compound comprises at least one of trimethyl phosphate, triethyl phosphate, dimethyl ethyl phosphate, methyl diethyl phosphate, ethylene methyl phosphate, ethylene ethyl phosphate, triphenyl phosphate, trimethyl phosphite, triethyl phosphite, triphenyl phosphite, tris (2,2,2-trifluoroethyl) phosphate, or tris(2,2,3,3,3-pentafluoropropyl) phosphate.

In some embodiments, based on the total weight of the electrolyte, a weight percentage of the second additive is 1% to 15%.

In some embodiments, the electrolyte further comprises a third additive. The third additive comprises a fluorine-containing aromatic compound. The fluorine-containing aromatic compound comprises at least one of fluorobenzene, difluorobenzene, trifluorobenzene, tetrafluorobenzene, pentafluorobenzene, hexafluorobenzene, or benzotrifluoride.

In some embodiments, based on the total weight of the electrolyte, a weight percentage of the third additive is 1% to 15%.

In some embodiments, the negative electrode used in the electrochemical device comprises a negative electrode active material. The negative electrode active material is not limited to a specific type, and may be selected based on needs. Specifically, the negative electrode active material may be selected from at least one of lithium metal, structured lithium metal, natural graphite, artificial graphite, mesocarbon microbeads (MCMB), hard carbon, soft carbon, silicon, a silicon-carbon composite, a Li—Sn alloy, a Li—Sn—O alloy, Sn, SnO, $SnO_2$, spinel-structure lithiated $TiO_2$—$Li_4Ti_5O_{12}$, and a Li—Al alloy.

In some embodiments, the electrochemical device is a lithium-ion secondary battery. To prevent the lithium metal from being unintentionally precipitated on the negative electrode during charging, a capacity of the negative electrode active material capable of intercalating and delithiating lithium ions is preferably greater than a capacity of the positive electrode active material. Therefore, amounts of the positive electrode active material and the negative electrode active material need to be adjusted accordingly to obtain high energy density. In some embodiments, a ratio of the negative electrode capacity to the positive electrode capacity may be 1.01 to 1.2.

In some embodiments, the electrochemical device according to this application has a separator provided between the positive electrode and the negative electrode to prevent short circuits. The separator used in the electrochemical device according to this application is not particularly limited to any material or shape, and may be based on any technology disclosed in the prior art. In some embodiments, the separator comprises a polymer or an inorganic material formed by a material stable to the electrolyte of this application.

For example, the separator may comprises a porous substrate and a surface treatment layer. The porous substrate is a non-woven fabric, a film, or a composite film with a porous structure, and a material of the porous substrate is selected from at least one of polyethylene, polypropylene, polyethylene terephthalate, or polyimide. Specifically, a polypropylene porous membrane, a polyethylene porous membrane, a polypropylene non-woven fabric, a polyethylene non-woven fabric or a polypropylene-polyethylene-polypropylene porous composite membrane can be selected.

A surface treatment layer is disposed on at least one surface of the porous substrate, and the surface treatment layer may be a polymer layer or an inorganic material layer, or may be a layer formed by a mixture of a polymer and an inorganic material.

The inorganic material layer comprises inorganic particles and a bonding agent. The inorganic particles are selected from a combination of one or more of aluminum oxide, silicon oxide, magnesium oxide, titanium oxide, hafnium oxide, tin oxide, ceria oxide, nickel oxide, zinc oxide, calcium oxide, zirconium oxide, yttrium oxide, silicon carbide, boehmite, aluminum hydroxide, magnesium hydroxide, calcium hydroxide, and barium sulfate. The binder is selected from a combination of one or more of polyvinylidene fluoride, a vinylidene fluoride-hexafluoropropylene copolymer, polyamide, polyacrylonitrile, polyacrylate, polyacrylic acid, polyacrylate, polyvinylpyrrolidone, polyvinyl ether, polymethyl methacrylate, polytetrafluoroethylene, and polyhexafluoropropylene. The polymer layer contains a polymer, and a material of the polymer comprises at least one of polyamide, polyacrylonitrile, acrylate polymer, polyacrylic acid, polyacrylate, polyvinylpyrrolidone, polyvinyl ether, polyvinylidene fluoride, or poly(vinylidene fluoride-hexafluoropropylene).

In some embodiments, the electrochemical device according to this application is a lithium-ion battery. A positive electrode of the lithium-ion battery comprises a positive electrode current collector and a positive electrode active material layer applied on the positive electrode current collector, and a negative electrode comprises a negative electrode current collector and a negative electrode active material layer applied on the negative electrode current collector.

II. Electronic Device

The electrochemical device according to this application is applicable to electronic device in various fields.

The electrochemical device according to this application is not particularly limited to any purpose, and may be used for any known purposes in the prior art. In one embodiment, the electrochemical device of this application may be used for, but is not limited to, a notebook computer, a pen-input computer, a mobile computer, an electronic book player, a portable telephone, a portable fax machine, a portable copier, a portable printer, a stereo headset, a video recorder, a liquid crystal television, a portable cleaner, a portable CD player, a mini-disc, a transceiver, an electronic notebook, a calculator, a memory card, a portable recorder, a radio, a standby power source, a motor, an automobile, a motorcycle, a motor bicycle, a bicycle, a lighting appliance, a toy, a game console, a clock, an electric tool, a flash lamp, a camera, a large household battery, a lithium-ion capacitor, or the like.

III. Embodiments

The following describes performance evaluation performed based on Embodiments of a lithium-ion battery in this application and comparative Embodiments.

Preparation of a Lithium-Ion Battery (1) Preparation of a negative electrode: Artificial graphite, styrene-butadiene rubber, and sodium carboxymethyl cellulose were fully stirred and mixed in an appropriate amount of deionized water solvent at a weight ratio of 97.4:1.2:1.4, to form a uniform negative electrode slurry; and the slurry was applied onto a negative electrode current collector copper foil, followed by drying and cold pressing, to obtain a negative electrode active material layer, and tabs were welded to obtain a negative electrode.

(2) Preparation of an electrolyte: In an argon atmosphere glove box with a water content less than 10 ppm, ethylene carbonate, propylene carbonate, and diethyl carbonate were well mixed at a mass ratio of 3:3:4, and then fully dried lithium hexafluorophosphate was dissolved in the foregoing non-aqueous solvent to form a basic electrolyte in which a concentration of the lithium hexafluorophosphate is 1 mol/L. Materials with different percentages, as shown in the tables below, were added into the basic electrolyte solution, to obtain electrolyte solutions in different Embodiments and comparative Embodiments.

(3) Preparation of a positive electrode

Preparation of Positive Electrodes in Embodiments 1 to 22 and Comparative Embodiment 1:

Lithium cobaltate, acetylene black, and polyvinylidene fluoride were fully stirred and mixed in an appropriate amount of N-methylpyrrolidone solvent at a weight ratio of 96:2:2 to form a uniform positive electrode slurry; and the slurry was applied on a positive electrode current collector aluminum foil, followed by drying and cold pressing, to obtain a positive electrode active material layer, and tabs were welded to obtain a positive electrode.

Preparation of Positive Electrodes in Embodiments 23 to 57:

Lithium cobaltate doped with the aluminum element (a weight percentage of the aluminum element in a specific Embodiment is shown in Table 2 and Table 3), acetylene black, and polyvinylidene fluoride were fully stirred and mixed in an appropriate amount of N-methylpyrrolidone solvent at a weight ratio of 96:2:2 to form a uniform positive electrode slurry; and the slurry was applied on a positive electrode current collector aluminum foil, followed by drying and cold pressing, to obtain a positive electrode.

(4) Separator: A porous polyethylene film was used as a separator.

(5) Preparation of a lithium-ion battery: The positive electrode, the separator, and the negative electrode were laminated in order, so that the separator was located between the positive electrode and the negative electrode for separation, followed by winding to obtain an electrode assembly; the electrode assembly was placed into a packaging case, and the prepared electrolyte was injected into the dried packaging case, followed by processes such as vacuum packaging, standing, chemical conversion, and shaping, to complete preparation of a lithium-ion battery.

Test Method

Lithium-ion batteries in Embodiments 1 to 55 and Comparative Embodiment 1 were prepared according to the foregoing preparation methods, and the lithium-ion batteries was subjected to a high-temperature cycle test, a floating charge test, and a DSC test.

High-Temperature Cycle Test

A lithium-ion battery was placed in a 45° C. thermostat, charged to 4.4 V at a constant current of 1.5 C, charged to 0.05 C at a constant voltage of 4.4 V, and discharged to 3.0 V at a constant current of 1.0 C. This was the first charge and discharge cycle. 500 charge and discharge cycles were performed in the foregoing manner, a capacity retention rate was monitored, where capacity retention rate=(remaining discharge capacity/initial discharge capacity)×100%.

Floating Charge Test

A lithium-ion battery was placed in a 45° C. thermostat, charged to 4.4 V at a constant current of 1.5 C, and an initial thickness (D0) at this time was recorded. The lithium-ion battery was charged to 0.05 C at a constant voltage of 4.4 V, and then constant-current charged at a small current of 0.05 C for 1500 h, a thickness (D1) after floating charge was recorded, and a thickness growth rate in the floating charge process was monitored, where thickness growth rate=(D1−D0)/D0×100%.

DSC Test

A lithium-ion battery was discharged and then disassembled. A disassembled positive electrode plate was washed with dimethyl carbonate (DMC) three times, followed by drying for 24 hours and a DSC test, to obtain a DSC curve of a positive electrode active material, a position of an exothermic peak, and an area of the exothermic peak. DSC test procedure: 3 mg of the dried sample was taken and heated from a room temperature to 450° C. at a rate of 10° C./min in a nitrogen atmosphere.

Method for Calculating a Cyano Group Content in an Electrolyte

An electrolyte was centrifugated after a lithium-ion battery was discharged. A gas chromatography-mass spectrometry (GC-MS) test was performed on a liquid obtained through centrifugation, a mass (M) of each nitrile compound was detected, and a mole number of each nitrile compound was calculated based on a relative atomic mass (MO) of each nitrile compound, that is, M/MO (mol). A mole number of another component in the electrolyte could be obtained by using the same method. A cyano group content in a nitrile compound in the electrolyte was calculated as follows: (mole number of the nitrile compound/total mole numbers of materials in the electrolyte)×quantity of cyano groups in one nitrile compound molecule×100%. The cyano group content in the electrolyte was a sum of cyano group contents in various nitrile compounds in the electrolyte.

Method for Testing a Transition Metal Ion Content in an Electrolyte

After a lithium-ion battery was discharged, centrifugation was performed. An inductively coupled plasma emission spectroscopy (ICP) test was performed on a liquid obtained through centrifugation, to obtain a weight percentage of transition metal ions (for example, cobalt ions and copper ions) in an electrolyte.

Test Result

Table 1 shows test results of lithium-ion batteries in Embodiments 1 to 22 and Comparative Embodiment 1.

TABLE 1

| | Nitrite compound | Nitrite compound content (%) | Cyano group molar percentage (%) | A/B | Cu ion weight percentage (%) | Co ion weight percentage (%) | Capacity retention rate | Thickness growth rate |
|---|---|---|---|---|---|---|---|---|
| Embodiment 1 | Glutaronitrile | 2 | 6 | 150 | 0.02 | 0.02 | 66.40% | 18.50% |
| Embodiment 2 | Adiponitrile | 2.5 | 6.8 | 170 | 0.02 | 0.02 | 66.70% | 18.30% |
| Embodiment 3 | Formula II-1 | 2 | 5.6 | 140 | 0.02 | 0.02 | 66.20% | 19.80% |

TABLE 1-continued

| | Nitrite compound | Nitrite compound content (%) | Cyano group molar percentage (%) | A/B | Cu ion weight percentage (%) | Co ion weight percentage (%) | Capacity retention rate | Thickness growth rate |
|---|---|---|---|---|---|---|---|---|
| Embodiment 4 | 2-methyl glutaronitrile | 3 | 8.4 | 210 | 0.02 | 0.02 | 66.80% | 17.50% |
| Embodiment 5 | Formula II-3 | 3 | 8.4 | 210 | 0.02 | 0.02 | 67.60% | 17.10% |
| Embodiment 6 | Succinonitrile | 3 | 7.2 | 180 | 0.02 | 0.02 | 62.00% | 19.50% |
| Embodiment 7 | Formula III-1 | 3 | 6.8 | 170 | 0.02 | 0.02 | 63.70% | 18.00% |
| Embodiment 8 | 2-methyl glutaronitrile | 0.5 | 1.2 | 30 | 0.02 | 0.02 | 54.30% | 23.70% |
| Embodiment 9 | 2-methyl glutaronitrile | 1.5 | 4 | 100 | 0.02 | 0.02 | 58.50% | 20.40% |
| Embodiment 10 | 2-methyl glutaronitrile + adiponitrile | 3 + 3 | 17 | 425 | 0.02 | 0.02 | 68.40% | 16.50% |
| Embodiment 11 | 2-methyl glutaronitrile + adiponitrile + succinonitrile | 4 + 3 + 3 | 28.4 | 710 | 0.02 | 0.02 | 56.30% | 19.60% |
| Embodiment 12 | Formula II-1 | 2.5 | 7.35 | 210 | 0.005 | 0.03 | 68.80% | 17.40% |
| Embodiment 13 | Formula II-1 + adiponitrile | 1 + 3 | 12.6 | 210 | 0.03 | 0.03 | 69.80% | 17.00% |
| Embodiment 14 | Succinonitrile + adiponitrile + glutaronitrile | 2 + 3 + 3 | 23.1 | 210 | 0.08 | 0.03 | 69.70% | 16.90% |
| Embodiment 15 | 2-methyl glutaronitrile + formula II-1 + formula II-3 | 3.5 + 3 + 3 | 27.3 | 210 | 0.1 | 0.03 | 58.80% | 19.80% |
| Embodiment 16 | Formula II-3 | 0.5 | 7.0 | 200 | 0.03 | 0.005 | 70.80% | 16.30% |
| Embodiment 17 | 2-methyl glutaronitrile + adiponitrile + glutaronitrile | 2 + 3 + 3 | 23.1 | 210 | 0.03 | 0.08 | 68.70% | 16.50% |
| Embodiment 18 | 2-methyl glutaronitrile + adiponitrile + glutaronitrile | 3.5 + 3 + 3 | 27.3 | 210 | 0.03 | 0.1 | 54.30% | 19.20% |
| Embodiment 19 | Glutaronitrile | 0.5 | 1 | 5 | 0.1 | 0.1 | 54.20% | 20.40% |
| Embodiment 20 | Succinonitrile | 6 | 20 | 5000 | 0.002 | 0.002 | 72.30% | 16.10% |
| Embodiment 21 | Glutaronitrile | 5 | 45 | 15000 | 0.001 | 0.002 | 72.80% | 15.80% |
| Embodiment 22 | Malononitrile + adiponitrile | 6 + 4 | 60 | 30000 | 0.001 | 0.001 | 57.60% | 19.70% |
| Comparative Embodiment 1 | / | / | / | / | 0.12 | 0.11 | 45.20% | 26.10% |

The electrolyte in Comparative Embodiment 1 in Table 1 had no nitrile compound added, and its lithium-ion battery had a low cycle capacity retention rate at a high temperature and a large thickness growth rate in floating charge.

It can be learned from comparison between Embodiments 1 to 7 and Comparative Embodiment 1 that adding a nitrile compound to the electrolyte could effectively improve high-temperature cycle performance and floating charge performance of the lithium-ion battery. This is because the cyano group in the nitrile compound could complex with the transition metal on a surface of the positive electrode active material to reduce leaching of the transition metal, thereby improving the high-temperature cycle performance and the floating charge performance of the lithium-ion battery. It can be learned from Embodiments 8 to 11 that adding a nitrile compound to the electrolyte could improve the high-temperature cycle performance and the floating charge performance, but when the weight percentage of the nitrile compound was increased to 10%, the improvement effect was weakened. This is mainly because an increase in the nitrile compound content resulted in increased polarization of the lithium-ion battery, and therefore the effect of improving high-temperature storage and floating charge was weakened.

It can be learned from comparison between Embodiments 12 to 15 and Comparative Embodiment 1 that when the copper ion content in the electrolyte was increased to 0.1%, the copper ions in the electrolyte destroyed stability of the negative electrode structure, and even if the cyano group content in the electrolyte was increased, corrosion of the copper foil could not be alleviated. Therefore, the effect of improving the high-temperature cycle performance and the floating charge performance was weakened.

It can be learned from comparison between Embodiments 16 to 18 and Comparative Embodiment 1 that when the cobalt ion content in the electrolyte was increased to 0.1%, the positive electrode active material was significantly destroyed, and even if the cyano group content in the electrolyte was increased, the positive electrode active material could not be effectively protected. Therefore, the effect of improving the high-temperature cycle performance and the floating charge performance was weakened.

It can be learned from comparison between Embodiments 19 to 22 and Comparative Embodiment 1 that when the value range of A/B in the electrolyte was $5 \leq A/B \leq 30000$, the lithium-ion battery had better high-temperature cycle performance and floating charge performance.

Table 2 shows test results of lithium-ion batteries in Embodiments 23 to 29 and Embodiment 16. The difference between Embodiment 23 to Embodiment 29 and Embodiment 16 lies in the data shown in the table.

TABLE 2

| | C (wt %) | A (mol %) | A/C | Capacity retention rate | Thickness growth rate |
|---|---|---|---|---|---|
| Embodiment 16 | 0 | 7.00 | / | 70.80% | 16.30% |
| Embodiment 23 | 0.05 | 7.00 | 140 | 72.30% | 15.20% |
| Embodiment 24 | 0.10 | 7.00 | 70 | 73.80% | 14.80% |
| Embodiment 25 | 0.30 | 7.00 | 23 | 74.50% | 14.10% |
| Embodiment 26 | 0.50 | 7.00 | 14 | 74.60% | 13.90% |
| Embodiment 27 | 1 | 7.00 | 7 | 71.80% | 16.10% |
| Embodiment 28 | 1 | 1.40 | 1.4 | 71.20% | 15.70% |
| Embodiment 29 | 0.05 | 8.50 | 170 | 70.90% | 15.90% |

It can be learned from comparison between Embodiments 23 to 28 and Embodiment 16 that using a positive electrode active material doped with the aluminum element to prepare a positive electrode could effectively improve the high-temperature cycle performance and floating charge performance of the lithium-ion battery. This is because the Al—O bond is stronger than the Co—O bond. After the positive electrode active material was doped with the aluminum element, the aluminum element could stabilize the structure of the delithiated positive electrode active material and alleviate structural collapse, thereby improving the high-temperature cycle performance and the floating charge performance of the lithium-ion battery. However, when the weight percentage of the aluminum element was increased to 1%, because the doping amount of the aluminum element was too high, the discharge capacity of the positive electrode was deteriorated, weakening the effect of improving the high-temperature cycle performance and the floating charge performance of the lithium-ion battery.

Through comparison between Embodiments 27 to 29 and Embodiment 16, when the cyano group content in the electrolyte and the aluminum element content in the positive electrode active material met the relationship of $0.01 \le A/C \le 170$, the high-temperature cycle performance and the floating charge performance of the lithium-ion battery could be effectively improved. When the ratio was less than 0.01, the cyano group content was too low, and therefore the effect of stabilizing the structure of the positive electrode active material and increasing corrosion resistance of the copper foil was not obvious, and the cycle performance and the floating charge performance could not be significantly improved. When the ratio was greater than 170, the aluminum element content in the positive electrode active material was too low, and the cyano group content in the electrolyte was too high, resulting in that the discharge capacity of the positive electrode active material was too low and polarization of the lithium-ion battery was too large, and then weakening the effect of improving the high-temperature cycle performance and the floating charge performance of the lithium-ion battery.

Table 3 shows test results of lithium-ion batteries in Embodiments 16, 25, and 30 to 38 and Comparative Embodiment 1. The difference between Embodiment 30 to Embodiment 37 and Embodiment 25 lies in the data shown in the table.

TABLE 3

| | C (wt %) | A (mol %) | First exothermic peak | Second exothermic peak | Area of the first exothermic peak | Area of the second exothermic peak | Capacity retention rate | Thickness growth rate |
|---|---|---|---|---|---|---|---|---|
| Embodiment 25 | 0.30 | 7 | 244 | 283 | 50 | 800 | 74.50% | 14.10% |
| Embodiment 30 | 0.30 | 7.5 | 256 | 295 | 49 | 789 | 76.30% | 12.20% |
| Embodiment 31 | 0.30 | 8 | 267 | 306 | 48 | 789 | 76.70% | 12.00% |
| Embodiment 32 | 0.30 | 8.5 | 279 | 318 | 49 | 786 | 75.90% | 13.80% |
| Embodiment 33 | 0.5 | 7 | 266 | 305 | 46 | 721 | 75.50% | 13.50% |
| Embodiment 34 | 0.40 | 7 | 267 | 307 | 43 | 603 | 76.20% | 12.70% |
| Embodiment 35 | 0.35 | 7 | 268 | 308 | 39 | 512 | 76.40% | 12.30% |
| Embodiment 36 | 0.50 | 8.5 | 269 | 303 | 32 | 391 | 75.40% | 13.10% |
| Embodiment 37 | 0.30 | 0 | 229 | 268 | 59 | 860 | 53.20% | 20.30% |
| Embodiment 16 | 0.00 | 7 | 231 | 272 | 57 | 840 | 55.20% | 18.40% |
| Comparative Embodiment 1 | 0 | 0 | 227 | 266 | 56 | 868 | 45.20% | 26.10% |

It can be learned from Table 3 that the DSC test curve of each positive electrode active material in Embodiment 25 and Embodiments 30 to 36 comprised at least two exothermic peaks. The temperature X corresponding to the first exothermic peak was 240° C.≤X≤280° C., the peak area of the first exothermic peak was less than or equal to 50 J/g, the temperature Y corresponding to the second exothermic peak was 280° C.<Y≤340° C., and the peak area of the second exothermic peak was less than or equal to 800 J/g. Compared with Comparative Embodiment 1, the exothermic peaks of each positive electrode active material in Embodiment 25 and Embodiments 30 to 36 were delayed and the exothermic areas were reduced. Therefore, thermal stability of the positive electrode active material was better, thereby effectively improving the high-temperature cycle performance and the floating charge performance of the lithium-ion battery.

Table 4 shows test results of lithium-ion batteries in Embodiments 38 to 57 and Embodiment 25. In Embodiments 38 to 57, on the basis of Embodiment 25, the compound of formula IV and/or the first additive was further added to the electrolyte.

TABLE 4

| | Compound of formula IV | | First additive | | | |
|---|---|---|---|---|---|---|
| | Structural formula | Weight percentage (%) | FEC (%) | $LiPO_2F_2$ (%) | Capacity retention rate | Thickness growth rate |
| Embodiment 25 | / | / | / | / | 74.50% | 14.10% |
| Embodiment 38 | Formula IV-3 | 0.05 | / | / | 74.70% | 13.80% |
| Embodiment 39 | Formula IV-3 | 0.1 | / | / | 75.1% | 13.1% |
| Embodiment 40 | Formula IV-3 | 3.00 | / | / | 76.10% | 11.30% |
| Embodiment 41 | Formula IV-3 | 5.00 | / | / | 75.10% | 12.90% |
| Embodiment 42 | Formula IV-1 | 3.00 | / | / | 75.60% | 12.30% |
| Embodiment 43 | Formula IV-2 | 3.00 | / | / | 75.90% | 12.10% |
| Embodiment 44 | / | / | 0.50 | / | 75.10% | 13.50% |
| Embodiment 45 | / | / | 3.00 | / | 75.90% | 12.50% |
| Embodiment 46 | / | / | 6.00 | / | 75.70% | 12.80% |
| Embodiment 47 | / | / | 10.00 | / | 74.90% | 13.80% |
| Embodiment 48 | / | / | / | 0.05 | 75.20% | 13.70% |
| Embodiment 49 | / | / | / | 0.30 | 76.70% | 12.10% |
| Embodiment 50 | / | / | / | 0.49 | 77.20% | 12.00% |
| Embodiment 51 | / | / | / | 0.80 | 76.10% | 12.50% |
| Embodiment 52 | / | / | / | 1.50 | 75.10% | 13.50% |
| Embodiment 53 | Formula IV-1 | 2.00 | 3.00 | / | 76.90% | 10.80% |
| Embodiment 54 | Formula IV-1 | 2.00 | / | 0.30 | 76.50% | 11.20% |
| Embodiment 55 | / | / | 3.00 | 0.30 | 77.10% | 11.40% |
| Embodiment 56 | Formula IV-1 | 2.00 | 3.00 | 0.30 | 77.80% | 10.10% |
| Embodiment 57 | / | / | 4.00 | 0.49 | 77.60% | 10.50% |

It can be learned from Table 4 that adding the compound of formula IV and/or the first additive to the electrolyte could further improve the high-temperature cycle performance and the floating charge performance of the lithium-ion battery.

References to "some embodiments", "some of the embodiments", "an embodiment", "another Embodiment", "Embodiments", "specific Embodiments", or "some Embodiments" in the specification mean the inclusion of specific features, structures, materials, or characteristics described in at least one embodiment or Embodiment of this application in the embodiment or Embodiment. Therefore, descriptions in various places throughout the specification, such as "in some embodiments", "in the embodiments", "in an embodiment", "in another Embodiment", "in an Embodiment", "in a specific Embodiment", or "Embodiments", do not necessarily refer to the same embodiment or Embodiment in this application. In addition, a specific feature, structure, material, or characteristic herein may be combined in any appropriate manner in one or more embodiments or Embodiments.

Although illustrative embodiments have been demonstrated and described, a person skilled in the art should understand that the foregoing embodiments are not to be construed as limiting this application, and that the embodiments may be changed, replaced, and modified without departing from the spirit, principle, and scope of this application.

What is claimed is:

1. An electrochemical device, comprising:

a positive electrode, wherein the positive electrode contains a positive electrode active material that contains aluminum; and based on a total weight of the positive electrode active material, a weight percentage of the aluminum is C %, and 0.001<C<1; a negative electrode; a separator; and an electrolyte, wherein, the electrolyte contains a nitrile compound and transition metal ions, the transition metal ions comprise cobalt ions and copper ions; based on a total weight of the electrolyte, a weight percentage of the cobalt ions in the electrolyte is less than 0.1%, and a weight percentage of the copper ions in the electrolyte is less than 0.1%;

the nitrile compound comprises a compound of formula II:

formula II

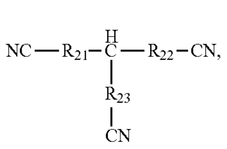

$R_{21}$, $R_{22}$, and $R_{23}$ are each independently selected from a single bond, substituted or unsubstituted $C_1$ to $C_5$ alkylidene groups, and substituted or unsubstituted $C_1$ to $C_{10}$ alkyleneoxy groups, when substitution is performed, a substituent group is selected from at least one of halogen, a cyano group, or a carboxyl group;

based on a total molar mass of the electrolyte, a molar percentage of a cyano group in the electrolyte is A %, based on the total weight of the electrolyte, a weight percentage of the transition metal ions in the electrolyte is B %, 5≤A/B≤30000, and 0.01≤A/C≤170.

2. The electrochemical device according to claim 1, wherein a curve of the positive electrode active material obtained through a differential scanning calorimetry test comprises a first exothermic peak and a second exothermic peak, a temperature corresponding to the first exothermic peak is X, 240° C.≤X≤280° C., a temperature corresponding to the second exothermic peak is Y, and 280° C.<Y≤340° C.

3. The electrochemical device according to claim 2, wherein a peak area of the first exothermic peak is ≤50 J/g, and a peak area of the second exothermic peak is ≤800 J/g.

4. The electrochemical device according to claim 1, wherein the electrolyte further comprises a compound of formula IV:

formula IV

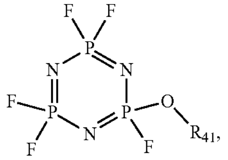

$R_{41}$ is selected from substituted or unsubstituted $C_1$ to $C_{12}$ alkyl groups, substituted or unsubstituted $C_3$ to $C_{12}$ cycloalkyl groups, substituted or unsubstituted $C_2$ to $C_{12}$ alkenyl groups, substituted or unsubstituted $C_2$ to $C_{12}$ alkynyl groups, substituted or unsubstituted $C_6$ to $C_{22}$ aryl groups, and substituted or unsubstituted $C_5$ to $C_{22}$ heteroaryl groups, when substitution is performed, a substituent group is selected from at least one of halogen, a cyano group, or a carboxyl group; and based on the total weight of the electrolyte, a weight percentage of the compound of formula IV is 0.001% to 5%.

5. The electrochemical device according to claim 1, wherein the electrolyte further comprises a first additive; the first additive comprises at least one of vinyl ethylene carbonate, fluorobenzene, lithium difluorophosphate, lithium tetrafluoroborate, 1,3,2-dioxathiolane,2,2-dioxide, fluoroethylene carbonate, vinylene carbonate, or 1,3-propane sultone; and based on the total weight of the electrolyte, a weight percentage of the additive is 0.001% to 13%.

6. An electronic device, comprising: the electrochemical device according to claim 1.

7. The electronic device according to claim 6, wherein a curve of the positive electrode active material obtained through a differential scanning calorimetry test comprises a first exothermic peak and a second exothermic peak, a temperature corresponding to the first exothermic peak is X, 240° C.≤X≤280° C., a temperature corresponding to the second exothermic peak is Y, and 280° C.<Y≤340° C.

8. The electronic device according to claim 2, wherein a peak area of the first exothermic peak is ≤50 J/g, and a peak area of the second exothermic peak is ≤800 J/g.

9. The electronic device according to claim 6, wherein the electrolyte further comprises a compound of formula IV:

formula IV

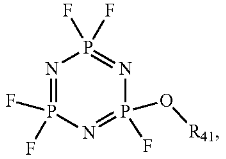

$R_{41}$ is selected from substituted or unsubstituted $C_1$ to $C_{12}$ alkyl groups, substituted or unsubstituted $C_3$ to $C_{12}$ cycloalkyl groups, substituted or unsubstituted $C_2$ to $C_{12}$ alkenyl groups, substituted or unsubstituted $C_2$ to $C_{12}$ alkynyl groups, substituted or unsubstituted $C_6$ to $C_{22}$ aryl groups, and substituted or unsubstituted $C_5$ to $C_{22}$ heteroaryl groups, when substitution is performed, a substituent group is selected from at least one of halogen, a cyano group, or a carboxyl group; and based on the total weight of the electrolyte, a weight percentage of the compound of formula IV is 0.001% to 5%.

10. The electronic device according to claim 6, wherein the electrolyte further comprises a first additive, the first additive comprises at least one of vinyl ethylene carbonate, fluorobenzene, lithium difluorophosphate, lithium tetrafluoroborate, 1,3,2-dioxathiolane,2,2-dioxide, fluoroethylene carbonate, vinylene carbonate, or 1,3-propane sultone, and based on the total weight of the electrolyte, a weight percentage of the additive is 0.001% to 13%.

11. The electrochemical device according to claim 1, wherein 2≤A≤10.

12. The electronic device according to claim 6, wherein 2≤A≤10.

13. The electrochemical device according to claim 1, wherein 0.002≤B≤0.2.

14. The electronic device according to claim 6, wherein 0.002≤B≤0.2.

* * * * *